United States Patent [19]

Hirose

[11] Patent Number: 4,812,513

[45] Date of Patent: Mar. 14, 1989

[54] EPOXY RESIN COMPOSITION AND PRODUCTION PROCESS THEREOF

[75] Inventor: Toshiyuki Hirose, Otake, Japan

[73] Assignee: Mitsui Petrochemical Industries, Ltd., Tokyo, Japan

[21] Appl. No.: 169,199

[22] PCT Filed: Jun. 17, 1987

[86] PCT No.: PCT/JP87/00393

§ 371 Date: Feb. 16, 1988

§ 102(e) Date: Feb. 16, 1988

[87] PCT Pub. No.: WO87/07900

PCT Pub. Date: Dec. 30, 1987

[30] Foreign Application Priority Data

Jun. 17, 1986 [JP] Japan .................................. 61-139277
Oct. 13, 1986 [JP] Japan .................................. 61-241400

[51] Int. Cl.$^4$ ........................ C08G 81/02; C08L 63/00
[52] U.S. Cl. ...................................................... 525/65
[58] Field of Search ............................................ 525/65

[56] References Cited

U.S. PATENT DOCUMENTS

| | | | |
|---|---|---|---|
| 4,548,985 | 10/1985 | Yazaki et al. ................ | 525/65 |
| 4,550,130 | 10/1985 | Kishida et al. .............. | 525/65 X |
| 4,720,516 | 1/1988 | Kishida et al. .............. | 525/65 X |
| 4,735,992 | 4/1988 | Nogues ........................ | 525/65 X |

Primary Examiner—Earl Nielsen
Attorney, Agent, or Firm—Armstrong, Nikaido, Marmelstein & Kubovcik

[57] ABSTRACT

An epoxy resin composition comprising:
(A) 1 to 40 parts by weight of a modified low molecular weight polyolefin obtained by graft copolymerizing at least one graft monomer selected from the group consisting of:
  (i) at least one unsaturated carboxylic acid derivative selected from the group consisting of unsaturated carboxylic acids and anhydrides thereof and esters thereof,
  (ii) at least one aromatic vinyl compound, and
  (iii) at least one nitrile compound, onto a low molecular weight polyolefin having an inherent viscosity [$\eta$] of 0.01 dl/g to 1.0 dl/g, as measured in decalin at a temperature of 135° C.,
(B) 99 to 60 parts by weight of an epoxy resin (the total amount of (A) and (B) is 100 parts by weight),
(C) a hardener for epoxy resin, and optionally
(D) 0.01 to 20 parts by weight of a monoamine compound.

This epoxy resin composition has an improved impact resistance, water resistance, anti-rust property, antioxidant property, chemical resistance, substantially without impairing the adhesiveness inherent in the epoxy resin.

18 Claims, No Drawings

EPOXY RESIN COMPOSITION AND PRODUCTION PROCESS THEREOF

TECHNICAL FIELD

The present invention relates to an epoxy resin composition and a production process thereof. More specifically, it relates to an epoxy resin having improved properties such as impact resistance, water resistance, rust resistance, oxidation resistance, chemical resistance, substantially without impairing the adhesiveness of the epoxy resin, by formulating a modified low-molecular weight polyolefin having at least one member selected from the group consisting of (i) unsaturated carboxylic acids and acid anhydrides thereof and esters thereof, (ii) aromatic vinyl compounds and/or (iii) nitrile compounds, grafted thereon, into a conventional epoxy resin or by formulating thereinto a monoamine compound, and to a production process thereof.

BACKGROUND ART

Hereinbefore, epoxy resins have been generally and widely used in the fields of, for example, adhesives, paints, coating agents for surface protection. Such epoxy resins, although having an excellent adhesiveness to metals, woods and other materials, have a drawback in that they generally have an inferior impact resistance and, therefore, cracks may be formed upon impact during use, or phenomena such as peel-off may occur. To eliminate these drawbacks and improve other various properties thereof, various compositions comprising polymers having a low glass transition point formulated into epoxy resins have been proposed. For example, Japanese Unexamined Patent Publication (Kokai) No. 54-83097 filed by the present Applicant discloses a composition containing a specific modified low molecular weight polyolefin formulated thereinto, which has an improved water resistance and chemical resistance. However, further research and a development of the improvement in the impact resistance is needed.

On the other hand, Japanese Unexamined Patent Publication (Kokai) No. 51-551 discloses a composition comprising an ethylene copolymer containing an epoxy group. Although the impact resistance of this composition is considerably improved, because of the high molecular weight of the modifier, the problems arise of a compatibility with the epoxy resin, a lowering of workability due to an increased viscosity, and the final appearance of the applied coating.

Also, Japanese Unexamined Patent Publication (Kokai) No. 55-84335 discloses a composition comprising a modified liquid polyisoprene rubber to which maleic anhydride or a derivative thereof is added, an epoxy resin and a curing accelerator. However, under the conditions specifically shown in the Example, the reaction between the modified liquid polyisoprene and the epoxy resin is insufficient and a composition having a poor adhesiveness and impact resistance is produced.

Further, Japanese Unexamined Patent Publication (Kokai) No. 57-98535 discloses an epoxy resin composition containing a maleated polybutadiene and a tertiary amine formulated thereinto, but this is not practical because the surface hardness and heat resistance are greatly reduced.

As described above, in epoxy resin compositions of the prior art, because of the high molecular weight of the modifier which is added to improve the impact resistance, the compatibility with the epoxy resin is generally not good, and an increase of the viscosity occurs when the composition is used in the molten state or the solution state, whereby there arise drawbacks such as the lower workability when formed into conventional paints or adhesives and an inferior appearance of the applied coating when formed into a composition for powdery paint. Furthermore, these epoxy resin compositions cannot be considered to have a satisfactory improvement of the impact resistance, and a further development of the water resistance, rust resistance, oxidation resistance, and chemical resistance, is necessary.

DISCLOSURE OF THE INVENTION

Accordingly, an object of the present invention is to provide an epoxy resin composition having improved characteristics such as impact resistance, water resistance, rust resistance, oxidation resistance, chemical resistance, without impairing the adhesiveness of the epoxy resin, and the production process thereof.

That is, in accordance with the present invention, there is provided an epoxy resin composition comprising:

(A) 1 to 40 parts by weight of a modified low molecular weight polyolefin obtained by graft copolymerizing at least one graft monomer selected from the group consisting of:
  (i) at least one unsaturated carboxylic acid derivative selected from the group consisting of unsaturated carboxylic acids and anhydrides thereof and esters thereof,
  (ii) at least one aromatic vinyl compound, and
  (iii) at least one nitrile compound, onto a low molecular weight polyolefin having an intrinsic viscosity [$\eta$] of 0.01 dl/g to 1.0 dl/g, as measured in decalin at 135° C., (B) 99 to 60 parts by weight of an epoxy resin (the total amount of (A) and (B) is 100 parts by weight), and (C) a hardener for the epoxy resin.

According to the present invention, there is also provided a process for producing an epoxy resin composition containing the components (A), (B) and (C), which comprises kneading the above-mentioned components (A) and (B) while heating, to make the unreacted amount of the component (B), based upon 100 parts by weight of the component (A), 1 part by weight or less, and then formulating the mixture with the hardener (C) at a temperature not higher than the hardening temperature of the hardener (C).

According to the present invention, there is further provided an epoxy resin composition comprising:

(A) 1 to 40 parts by weight of a modified low molecular weight polyolefin obtained by graft copolymerizing at least one graft monomer selected from the group consisting of:
  (i) at least one unsaturated carboxylic acid derivative selected from the group consisting of unsaturated carboxylic acids and nnhydrides thereof and esters thereof,
  (ii) at least one aromatic vinyl compound, and
  (iii) at least one nitrile compound, onto a low molecular weight polyolefin having an inherent viscosity [$\eta$] of 0.01 dl/g to 1.0 dl/g, as measured in decalin at 135° C., (B) 99 to 60 parts by weight of an epoxy resin (the total amount of (A) and (B) is 100 parts by weight), (C) a hardener for the epoxy resin, and (D) 0.01 to 20 parts by weight of a monoamine compound.

According to the present invention, there is still further provided a process for producing an epoxy resin composition containing the components (A), (B), (C) and (D), which comprises reacting the above-mentioned components (A), (B) and (D) by kneading, while heating, and then formulating the hardener (C) at a temperature not higher than the hardening temperature of the hardener (C).

BEST MODE FOR CARRYING OUT THE INVENTION

The composition according to the present invention has both an excellent impact resistance and adhesiveness and, when employed as the composition for a powdery paint, has a good pulverizability of the composition, blocking can be prevented, and an applied coating having an excellent appearance can be obtained. Also, due to a good flexibility, it is suitable for application when it is adhered to a material having flexibility.

MODIFIED LOW MOLECULAR WEIGHT POLYOLEFIN (A)

The low molecular weight polyolefin to be used as the starting material for the modified low molecular weight polyolefin usable in the present invention has an intrinsic viscosity $[\eta]$ of 0.01 dl/g to 1.0 dl/g, as measured at 135° C. in decalin. Examples of such a low molecular weight polyolefin are homopolymers or copolymers of α-olefins such as ethylene, propylene, butene-1, hexene-1, 4-methyl-1-pentene, decene. As such an α-olefin, for example, straight or branched α-olefins having 2 to 10 carbon atoms are preferred. Specifically, polyethylene, polypropylene, ethylene-propylene copolymer, poly-1-butene, poly-4-methyl-1-pentene, ethylene-propylene copolymer, ethylene-1-butene copolymer, and ethylene-4-methyl-1-pentene copolymer are exemplified.

As the above-mentioned polyolefin having a relatively low molecular weight, those produced by a pyrolysis of polyolefins having a relatively higher molecular weight obtained by, for example, the high pressure polymerization method or the medium, low pressure polymerization method by using a transition metal compound catalyst, or high pressure method polyethylenes obtained by radical polymerization of the ethylene at a high pressure, or polyolefins obtained by the medium, low pressure polymerization method in the presence of hydrogen by using a transition metal compound catalyst. These polyolefins may be in the form of a solid, liquid and wax, preferably in the form of wax and liquid.

The polyolefin wax as mentioned herein refers to a homopolymer of an α-olefin such as ethylene, propylene, 1-butene, 1-hexene, 4-methyl-1-pentene, 1-decene, or a copolymer of two or more α-olefins, having an intrinsic viscosity of 0.03 to 1.0. For example, the polyethylene wax obtained by pyrolysis of the high pressure method polyethylene, the high pressure polymerization polyethylene wax obtained by radical polymerization of ethylene at a high pressure, the polyethylene wax obtained by the medium, low pressure polymerization of ethylene or ethylene and the above α-olefin in the presence of a transition metal compound catalyst, or ethylene, α-olefin copolymer wax, polypropylene wax, poly-1-butene wax may be used. Among these polyolefin waxes, polyolefin waxes composed mainly of ethylene are preferably used.

Furthermore, the low molecular weight liquid polyolefin may be an ethylenic random copolymer formed from ethylene and an α-olefin having 3 to 20 carbon atoms, having the content of ethylene component of 30 to 75 mol %, preferably 40 to 70 mol %, and the content of α-olefin component of 25 to 70 mol %, preferably 30 to 60 mol % (Note: the total of both components is 100 mol %). The ethylenic random copolymer has an intrinsic viscosity $[\eta]$ as measured at 135° C. in decalin, which is generally in the range of from 0.01 to 0.3 dl/g, preferably from 0.03 to 0.25 dl/g, a number average molecular weight is generally in the range of from 300 to 5,000, preferably from 500 to 4,000, and a molecular weight distribution ($\overline{M}w/\overline{M}n$), as measured by the GPC method, generally of from 1.1 to 4, preferably from 1.2 to 3.

Specific examples of the α-olefin component are propylene, 1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene. Furthermore, liquid homopolymers of dienes as represented by butadiene, isoprene, chloroprene, or liquid or waxy copolymers of these dienes with styrene or acrylonitrile, squalane can be exemplified.

According to the present invention, the low molecular weight polyolefin as described above can be modified by introducing (i) carboxylic group or acid anhydride group or esters thereof, (ii) an aromatic vinyl compound or (iii) a nitrile compound. The modification may be carried out by known methods such as graft reaction, copolymerization, of the monomer as described below, preferably by the former method.

As mentioned above, as the starting material for the modified low molecular weight polyolefin, liquid or waxy polyolefins are preferably used. Of these, preferable are liquid or waxy modified ethylenic random copolymers which are liquid or waxy modified random copolymers comprising (i) an unsaturated carboxylic acid derivative component selected from the group consisting of unsaturated carboxylic acid hving 3 to 10 carbon atoms and acid anhydride thereof and esters thereof, (ii) an aromatic vinyl compound or (iii) a nitrile compound graft copolymerized onto ethylenic random copolymers constituted of ethylene and an α-olefin having 3 to 20 carbon atoms.

The following description refers to the modified ethylenic random copolymer as an example, but the same description also applies to other modified polymers.

The grafted ratio of the unsaturated carboxylic acid derivative component in the modified ethylenic random copolymer is not particularly limited, but the preferred grafted ratio with respect to an amelioration of the mechanical properties and dispersibility in the epoxy resin may be generally in the range from 0.2 to 50 parts by weight, preferably from 0.5 to 40 parts by weight, based upon 100 parts by weight of the ethylenic random copolymer. Specific examples of the unsaturated carboxylic acid derivative component unit having 3 to 10 carbon atoms which is the graft copolymer component of the modified ethylenic random copolymer are unsaturated carboxylic acids such as acrylic acid, methacrylic acid, maleic acid, fumaric acid, itaconic acid, citraconic acid, tetrahydrophthalic acid, bicyclo[2,2,1-]hepto-2-ene-5,6-dicarboxylic acid; anhydrides of unsaturated carboxylic acids such as maleic anhydride, itaconic anhydride, citraconic anhydride, tetrahydrophthalic anhydride, [2,2,1]-hepto-2-ene-5,6-dicarboxylic acid anhydride; esters of unsaturated carboxylic acids such as methyl acrylate, methyl methacrylate, dimethyl maleate, monomethyl maleate, diethyl fumarate, dimethyl itaconate, diethyl citraconate, dimethyl tetrahydrophthalic anhydride, dimethyl bicyclo-[2,2,1]hepto-2-ene-5,6-dicarboxylate. Of these, maleic anhydride is most preferably used.

Although the intrinsic viscosity [η] of the modified ethylenic random copolymer according to the present invention, as measured at 135° C. in decalin, is not particularly limited, an intrinsic viscosity of from 0.01 dl/g to 1.0 dl/g, preferably from 0.01 to 0.3 dl/g, more preferably from 0.03 to 0.25 dl/g is preferable in view of the amelioration effect of mechanical properties when formulated as the modifier of the epoxy resin. Also, the number average molecular weight of the liquid modified ethylenic random copolymer is generally in the range of from 300 to 5,000, preferably from 500 to 4,000. Furthermore, for the same reason, the molecular weight distribution (Mw/Mn) of the liquid modified ethylenic random copolymer, as measured by gel permeation chromatography (GPC) is generally 4 or less, preferably in the range of from 1.2 to 3. Such a modified ethylenic random copolymer can be prepared by the method proposed in Japanese Unexamined Patent Publication (Kokai) No. 57-123205 by the present Applicant.

The aromatic vinyl and nitrile compounds usable for modifying the modified polyolefin which can be formulated in the epoxy resin composition according to the present invention can be prepared by, for example, graft polymerization of:

(1) 0 to 900 parts by weight, preferably 0 to 800 parts by weight, of an aromatic vinyl compound and 1 to 900 parts by weight, preferably 5 to 800 parts by weight of a nitrile compound, or (2) 1 to 900 parts by weight, preferably 5 to 800 parts by weight of an aromatic vinyl compound and 0 to 900 parts by weight, preferably 0 to 800 parts by weight of a nitrile compound, based upon 100 parts by weight of the low molecular weight polyolefin, as mentioned above, in a conventional manner. Examples of such an aromatic vinyl compound are styrene, α-methylstyrene, chlorostyrene, isopropenyltoluene, vinyltoluene, t-butylstyrene, divinylbenzene, and isopropenylphenol.

On the other hand, examples of the nitrile compound are acrylonitrile, methacrylonitrile and the like.

Although the intrinsic viscosity [η] of the aromatic vinyl/nitrile compound modified low molecular weight polyolefin according to the present invention, as measured at 135° C. in decalin, is not particularly limited, it is generally 0.03 to 1.0 dl/g, preferably 0.035 to 0.8 dl/g in view of the amelioration effect of mechanical properties when formulated as the modifier for the epoxy resin. Also, the number average molecular weight of the modified polyolefin is generally in the range of from 300 to 15,000, preferably from 500 to 13,000. The molecular weight distribution (Mw/Mn) of the modified polyolefin, as measured by gel permeation chromatography also is 4 or less, preferably in the range of from 1.2 to 3, for the same reason.

EPOXY RESIN (B)

The epoxy resin (B) to be formulated into the epoxy resin composition of the present invention is a conventional epoxy resin comprising a compound containing 2 or more epoxy groups in one molecule. Examples of such epoxy resins are glycidyl ether type epoxy resins of polyphenol compounds such as bisphenol A, bisphenol F, 1,1,2,2-tetrakis(4-hydroxyphenyl)-ethane and the like; glycidyl ether type epoxy resins of polyhydric phenols such as catechol, resorcin, hydroquinone, fluoroglycine and the like; glycidyl ether type epoxy resins of polyhydric alcohols such as ethylene glycol, butane diol, glycerol, erythritol, polyoxyalkylene glycol and the like; novolac type epoxy resins; cyclic aliphatic epoxy resins such as vinyl cyclohexene dioxide, limonene dioxide, dicylopentadiene dioxide and the like; polyglycidyl ester type epoxy resins of ester condensates of polycarboxylic acids such as phthalic acid, cyclohexane-1,2-dicarboxylic acid and the like; and polyglycidylamine type epoxy resins. Of these epoxy resins, glycidyl ether type epoxy resins of polyphenol compounds or novolac type epoxy resins are preferably formulated, and particularly preferably, a glycidyl ether type epoxy resin of bisphenol A or bisphenol F are formulated.

CURING AGENT (C) FOR EPOXY RESIN

As the hardener (C) to be formulated in the epoxy resin composition of the present invention, any compounds generally known as the hardener for epoxy resins can be used. Specific examples of such hardeners are chain aliphatic polyamines such as diethylenetriamine, triethylenetetramine, tetraethylenepentamine, dipropylenediamine, diethylaminopropylamine; cyclic aliphatic polyamine; aliphatic polyamine adducts; keimine; modified aliphatic polyamines; polyamidoamines; aromatic amines; aromatic modified amines; aromatic modified polyamines; tertiary amine type hardeners; mercaptan type hardeners; acid anhydride type hardeners; copolymers having acid anhydride groups such as ethylene-maleic anhydride copolymer; compounds having phenolic hydroxyl groups such as phenolic resin initial condensates; compounds such as dicyandiamide, melamine, boron trifluoride type complexes. Of these hardeners, dicyandiamide, aromatic polyamine such as diaminodiphenylmethane, boron trifluoride-amine complex compound are preferably used.

MONOAMINE COMPOUND (D)

Examples of the monoamine compound (D) to be formulated into the epoxy resin composition of the present invention are aliphatic primary amines such as propylamine, isopropylamine, butylamine, pentylamine, hexylamine, cyclohexylamine; aromatic primary amines such as aniline, toluidine, xylidine; secondary amines such as dimethylamine, diethylamine, dipropylamine, diisopropylamine, dibutylamine, dipentylamine, dicyclohexylamine, piperidine, N-methylaniline; tertiary amines such as triethylamine, tripropylamine, tributylamine, dimethylbenzylamine; preferably secondary amines, particularly aliphatic secondary amines, from the aspect of easy control of the pot life of the present composition.

COMPOSITION RATIOS OF RESPECTIVE COMPONENTS

The amount of the low molecular weight polyolefin (A) to be formulated into the epoxy resin composition of the present invention must be 1 to 40 parts by weight from the standpoint of surface hardness and toughness as well as impact strength and flexibility, preferably in the range of from 3 to 30 parts by weight, based upon 100 parts by weight of the total amount thereof with the epoxy resin (B). Similarly, the amount of the epoxy resin (B) is 99 to 60 parts by weight, preferably in the range of from 97 to 70 parts by weight. On the other hand, the ratio of the hardener (C) formulated may be an adequate amount relative to the epoxy resin (B); as in the case of conventional epoxy resins, preferably 1 to 300 parts by weight based upon 100 parts by weight of the modified polyolefin.

On the other hand, when a monoamine compound is formulated, the amount of the monoamine compound (D) formulated is generally 0.01 to 20 parts by weight, preferably 0.1 to 10 parts by weight, based upon 100 parts by weight of the epoxy resin (B) in view of the reactivity and the viscosity of the composition.

PRODUCTION PROCESS OF THE EPOXY RESIN COMPOSITION

The epoxy resin composition of the present invention can be prepared by kneading the modified polyolefin (A) and the epoxy resin (B) previously while heating, and then formulating the hardener at a temperature not higher than the hardening temperature of the hardener (C). The amount of the unreacted epoxy resin (B), in the reaction between the modified polyolefin (A) and the epoxy resin (B), is 1 part by weight or less based upon 100 parts by weight of the modified polyolefin (A), and the conditions of pre-blend therefor can be set generally at a kneading temperature of from 100° C. to 300° C. and a kneading time of from 1 minute to 10 hours. These ranges may be determined by the combination of the three conditions, the kind of the modifying agent, the kneading temperature, and the kneading time, to satisfy the above condition. However, it is generally preferable to set the kneading temperature at 110° C. to 250° C. and the kneading time at 2 minutes to 8 hours. By the kneading, the unreacted amount of the component (B) based upon 100 parts by weight of the component (A) should be made 1 part by weight or less, preferably 0.5 part by weight or less. If the conversion is lower and the unreacted amount exceeds 1% by weight, problems arise in that, for example, an improvement of the final cured product can not be obtained and the adhesiveness is lowered. After kneading, the mixture of the components (A) and (B) is cooled to a temperature not higher than the hardening temperature of the hardener, followed by addition of the hardener and, then, the resultant mixture is kneaded at that temperature. Thus the epoxy resin composition of the present invention is obtained. Also, if necessary, fillers, pigments, stabilizers, curing accelerators, thixotropic agents, flow controllers, and the like can be formulated.

On the other hand, when the monoamine compound (D) is formulated according to the present invention, the modified low molecular weight polyolefin (A), the epoxy resin (B), and the monoamine compound (D) are previously reacted together by kneading at ordinary temperature to 200° C., preferably while heating, as mentioned below, and then formulated with the hardener (C) at a temperature not higher than the hardening temperature of the hardener to prepare the composition. The reaction conditions of the modified polyolefin (A), the epoxy resin (B), and the monoamine compound (D) can be set preferably at a kneading temperature of from ordinary temperature to 150° C. and a kneading time of from 1 minute to 10 hours. These ranges may be determined by the combination of the kind of epoxy resin, the kind of modifying agent, the kind of monoamine compound (D), the kneading temperature, and the kneading time, to satisfy the above conditions. However, it is generally preferable to set the kneading temperature at ordinary temperature to 180° C. and the kneading time at 2 hours to 8 hours. Although the order of mixing the components (A), (B) and (D) is not particularly limited, the method as shown below in the Examples is preferred. After kneading, the mixture of the components (A), (B) and (D) is cooled to a temperature not higher than the hardening temperature of the hardener, followed by addition of the hardener and, then, the resultant mixture is kneaded at that temperature to give the epoxy resin composition of the present invention.

OTHERS

The epoxy resin composition according to the present invention can be utilized for usages such as paints, particularly powdery paint, surface coating agents, adhesives, molding materials. For example, it can be used when applied by the electrostatic coating method, the fluid dipping method, the press method, the extrusion molding method, the injection molding method, the casting method, the impregnation method, and the coating method with a solution.

As is clear from the above-mentioned explanation and the Examples shown below, the epoxy resin composition according to the present invention has an extremely strong impact resistance, and an excellent water resistance, chemical resistance, rust resistance, oxidation resistance, compared with epoxy resins or compositions containing other modifiers added thereto, and further the applied coating has a good appearance when used for paints.

EXAMPLES

The epoxy resin composition of the present invention and the production process thereof are described in detail below by referring to Examples.

The modified liquid ethylene-propylene random copolymers used in Examples 1 to 3 and Comparative Examples 1 to 6 are obtained by graft reaction according to the conventional method, using a liquid ethylene-propylene random copolymer with an ethylene/propylene composition ratio=50/50 mol %, a number average molecular weight of 810, $[\eta]=0.04$ dl/g and $\overline{Mw}/\overline{Mn}=1.40$, and di-tert-butyl peroxide as the initiator.

Also, the unreacted modified liquid polyolefin remained in the composition was quantitatively determined by liquid chromatography.

The peel-off test was conducted at a temperature of 23° C. and according to ASTM D1876-72. The T peel-off strength was tested by using an aluminum foil with a thickness of 50μ as the material to be adhered.

EXAMPLE 1

To 90 g of a bisphenol-type epoxy resin (EPOMIK ® R-304, produced by Mitsui Petrochemical Industries Ltd., epoxy equivalent 875–1,000, softening point 93°–104° C.) was added 10 g of a liquid ethylene-propylene random copolymer grafted with maleic anhydride (maleic anhydride content 10% by weight, ethylene/propylene composition ratio=50/50 mol %, number average molecular weight 810, $[\eta]=0.04$ dl/g, $\overline{Mw}/\overline{Mn}=1.40$) and the mixture was kneaded by a kneader under a nitrogen atmosphere at a temperature of 200° C. for 60 minutes. Unreacted modified liquid polyolefin in the kneaded composition was quantitatively determined by liquid chromatography. Subsequently, after cooling to 110° C., 3.6 g of dicyandiamide was added and the mixture was kneaded followed by pulverization to obtain a thermosetting composition. The composition was cured by heating at a temperature of 200° C. under a pressure of 60 kg/cm² for 10 minutes, and a measurement of the unnotched Izod impact strength and peel-off strength at 23° C. according to ASTM D-256 of the cured molding obtained was carried out. The results are shown in Table 1.

EXAMPLES 2 TO 4

Under the same conditions as in Example 1, except that the kneading time was 60 minutes in Example 1 but 30 minutes in this example, the intermediate thermosetting composition and the thermally cured molding were obtained. Similarly, the kneading time and the kneading temperature were changed as shown in Table 1 under Examples 3 and 4. The results are shown in Table 1.

EXAMPLE 5

A thermosetting composition was obtained under the same conditions as in Example 1, except that an acrylic acid adduct of a liquid ethylene-propylene copolymer (acrylic acid content 5% by weight, number average molecular weight 810, $[\eta]=0.04$, $\overline{M}w/\overline{M}n=1.40$) was used instead of the maleic anhydride adduct of the liquid ethylene-propylene copolymer in Example 1.

COMPARATIVE EXAMPLE 1

A thermosetting composition was obtained under the same conditions as in Example 1, except that the unmodified liquid ethylene-propylene copolymer (number average molecular weight 810, $[\eta]=0.04$, $\overline{M}w/\overline{M}n=1.40$) was used instead of the maleic anhydride adduct of the liquid ethylene-propylene copolymer in Example 1.

COMPARATIVE EXAMPLE 2

A thermosetting composition was obtained under the same conditions as in Example 1, except that a polyethylene wax modified with maleic anhydride (maleic anhydride content 5% by weight, number average molecular weight 1,400, $[\eta]=0.05$, $\overline{M}w/\overline{M}n=2.86$) was used instead of the maleic anhydride adduct of the liquid ethylene-propylene copolymer in Example 1.

COMPARATIVE EXAMPLE 3

A thermosetting composition was obtained under the same conditions as in Example 1, except that an unmodified polyethylene wax (number average molecular weight 1,000, $[\eta]=0.04$, $\overline{M}w/\overline{M}n=2.00$) was used instead of the maleic anhydride adduct of the liquid ethylene-propylene copolymer in Example 1.

COMPARATIVE EXAMPLE 4

A thermosetting composition was obtained under the same conditions as in Example 1, except that the graft adduct of Example 1 was not added.

The unnotched Izod impact strength and peel-off strength for these nine Examples are shown in Table 1.

TABLE 1

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Epoxy resin amount (parts by weight) | | 100 | 100 | 100 | 100 | 100 | 100 | 100 | 100 | 100 |
| (Liquid) Modified polyolefin | Base polymer | Liquid ethylene-propylene copolymer | Liquid ethylene-propylene copolymer | Liquid ethylene-propylene copolymer | Liquid ethylene-propylene copolymer | Liquid ethylene-propylene copolymer | Liquid ethylene-propylene copolymer | Polyethylene wax | Polyethylene wax | — |
| | Grafted monomer | Maleic anhydride | Maleic anhydride | Acrylic acid | Maleic anhydride | Maleic anhydride | — | Maleic anhydride | — | — |
| | Grafted amount (wt %) | 10 | 10 | 10 | 10 | 10 | — | 5 | — | — |
| | $[\eta]$ (dl/g) | 0.04 | 0.04 | 0.04 | 0.04 | 0.04 | 0.04 | 0.05 | 0.04 | — |
| | Number average molecular weight | 810 | 810 | 810 | 810 | 810 | 810 | 1400 | 1000 | — |
| | $\overline{M}w/\overline{M}n$ | 1.40 | 1.40 | 1.40 | 1.40 | 1.40 | 1.40 | 2.86 | 2.00 | — |
| | Amount added (parts by weight) | 11 | 11 | 11 | 11 | 11 | 11 | 11 | 11 | 0 |
| Hardener (dicyandiamide) amount (parts by weight) | | 4 | 4 | 4 | 4 | 4 | 4 | 4 | 4 | 4 |
| Kneading temperature (°C.) | | 200 | 200 | 200 | 200 | 110 | 200 | 200 | 200 | 200 |
| Kneading time (min.) | | 60 | 30 | 60 | 10 | 60 | 60 | 60 | 60 | 60 |
| Unreacted liquid modified polyolefin (parts by weight) | | 0.1 | 0.6 | 0.3 | 1.2 | 7.3 | 11* | 0.3 | 0 | 0 |
| Unnotched Izod impact strength (kg · cm/cm) | | 31 | 28 | 29 | 28 | 4.5 | 4.8 | 4.2 | 2.2 | 4.9 |
| Peel-off strength (kg/25 mm) | | 2.5 | 1.7 | 1.9 | 0.1 | 0.05 | 2.9 | 1.8 | 2.8 | 3.0 |

*Quantitative value of unmodified liquid polyolefin

EXAMPLE 6

Using a liquid ethylene-propylene random copolymer (ethylene/propylene composition ratio=50/50 mol %, number average molecular weight 810, $[\eta]=0.004$ dl/g, $\overline{M}w/\overline{M}n=1.40$) as the base polymer and di-tert-butyl peroxide as the initiator, maleic anhydride was grafted to obtain a liquid ethylene-propylene random copolymer modified with maleic anhydride, at a 10% by weight grafted ratio of the maleic anhydride. An amount of 10 parts by weight of the modified liquid ethylene-propylene random copolymer and 90 parts by weight of a bisphenol type epoxy resin (EPOMIK ® R-304, produced by Mitsui Petrochemical Industries Ltd., epoxy equivalent 875–1,000, softening point 93°–104° C.) were placed in a kneader, and while kneading at a temperature of 110° C., 1.3 parts by weight of di-n-butylamine were added and kneaded for 40 minutes, and then 3.6 parts by weight of dicyandiamide were added, followed by kneading for a further 5 minutes.

Then, the mixture was taken out of the kneader and pulverized to give a thermosetting composition. The composition was cured by heating at a temperature of 200° C. under a pressure of 60 kg/cm² for 10 minutes, and unnotched Izod impact strength according to ASTM D256 of the obtained cured molding was measured. Also, using a 50 μm aluminum foil as the material to be adhered, the T peel-off strength was measured according to ASTM D1876-72. The thickness of the adhesive layer was 50 μm. The results are shown in Table 2.

EXAMPLE 7

The same procedure as in Example 6 was repeated, except that di-n-butylamine in Example 6 was changed to 1.0 part by weight of tri-n-butylamine.

EXAMPLE 8

The same procedure as in Example 6 was repeated, except that di-n-butylamine in Example 6 was changed to 1.0 part by weight of n-hexylamine.

EXAMPLE 9

The same procedure as in Example 6 was repeated, except that di-n-butylamine in Example 6 was not added.

EXAMPLE 10

A 10 parts by weight amount of the modified liquid ethylene-propylene random copolymer and 90 parts by weight of the bisphenol type epoxy resin used in Example 6 were placed in a kneader and kneaded, without the addition of the amine, at a temperature of 200° C. for 40 minutes. Then, the temperature was lowered to 110° C., and 1.3 parts by weight of dicyandiamine were added and further kneaded for 5 minutes. The mixture was then withdrawn and pulverized to obtain a thermosetting resin composition. The evaluation results are shown in Table 2. As is clear from the results shown in the Table, when a monoamine compound is not added, although disadvantageous in practice, the peel-off strength is increased by raising the kneading temperature, but remains considerably lower than when a monoamine compound is added.

EXAMPLE 11

A liquid ethylene-propylene copolymer modified with acrylic acid with 8% by weight of the acrylic acid grafted ratio was obtained by grafting acrylic acid to the liquid ethylene-propylene random copolymer used in Example 6 by using the use of di-tert-butyl peroxide as the initiator. Using the ethylene-propylene copolymer modified with acrylic acid in place of the ethylene-propylene copolymer modified with maleic anhydride in Example 6, a thermosetting resin composition was obtained by kneading by the same procedure used in Example 6. The results are shown in Table 2.

EXAMPLE 12

The procedure of Example 11 was entirely repeated, except that di-n-butylamine was not added. The results are shown in Table 2.

EXAMPLE 13

To a liquid polybutadiene with a cis-1,4-linkage content of 85% or more and a number average molecular weight of 1,200 was grafted maleic anhydride by using di-tert-butyl peroxide as the initiator, to obtain a modified liquid polybutadiene with a grafted ratio of maleic anhydride of 10% by weight. Using the modified liquid polybutadiene instead of the modified liquid ethylene-propylene in Example 6, the same operation as in Example 6 was carried out to obtain a thermosetting resin composition. The results ar shown in Table 2.

COMPARATIVE EXAMPLE 5

The unnotched Izod impact strength and peel-off strength of the bisphenol type epoxy resins used in Examples 6-12 were then measured. The curing conditions are the same as in Example 6 and the results are shown in Table 2.

TABLE 2

| | | Example 6 | Example 7 | Example 8 | Example 9 | Example 10 | Example 11 | Example 12 | Example 13 | Comparative Example 5 |
|---|---|---|---|---|---|---|---|---|---|---|
| Epoxy resin amount (parts by weight) | | 90 | 90 | 90 | 90 | 90 | 90 | 90 | 90 | 100 |
| (Liquid) Modified polyolefin | Base polymer | Liquid ethylene-propylene copolymer | Liquid ethylene-propylene copolymer | Liquid ethylene-propylene copolymer | Liquid ethylene-propylene copolymer | Liquid ethylene-propylene copolymer | Liquid ethylene-propylene copolymer | Liquid ethylene-propylene copolymer | Liquid-polybutadiene | — |
| | Grafted monomer | Maleic anhydride | Maleic anhydride | Maleic anhydride | Maleic anhydride | Maleic anhydride | Acrylic acid | Acrylic acid | Maleic anhydride | — |
| | Grafted amount (wt %) | 10 | 10 | 10 | 10 | 10 | 8 | 8 | 10 | — |
| | [η] (dl/g) | 0.04 | 0.04 | 0.04 | 0.04 | 0.04 | 0.04 | 0.04 | 0.05 | — |
| | Number-average molecular weight | 810 | 810 | 810 | 810 | 810 | 810 | 810 | 1200 | — |
| | $\overline{Mw}/\overline{Mn}$ | 1.40 | 1.40 | 1.40 | 1.40 | 1.40 | 1.40 | 1.40 | 1.50 | — |
| | Amount added (parts by weight) | 10 | 10 | 10 | 10 | 10 | 10 | 10 | 10 | — |
| Amine | | di-n-butylamine | tri-n-butylamine | n-hexylamine | — | — | di-n-butylamine | — | di-n-butylamine | — |
| Amount of amine (parts by weight) | | 1.3 | 1.0 | 1.0 | — | — | 1.3 | — | 1.3 | — |
| Kneading temperature (°C.) | | 110 | 110 | 110 | 110 | 200 | 110 | 110 | 110 | — |

TABLE 2-continued

|  | Example | | | | | | | | Comparative Example |
|---|---|---|---|---|---|---|---|---|---|
|  | 6 | 7 | 8 | 9 | 10 | 11 | 12 | 13 | 5 |
| Kneading time (min.) | 45 | 45 | 45 | 45 | 45 | 45 | 45 | 45 | — |
| Hardener (dicyandiamide) amount (parts by weight) | 3.6 | 3.6 | 3.6 | 3.6 | 3.6 | 3.6 | 3.6 | 3.6 | 4 |
| Unnotched Izod impact strength (kg · cm/cm) | 38.5 | 35.0 | 28.0 | 4.5 | 28.0 | 34.0 | 4.4 | 27.0 | 4.9 |
| Peel-off strength (kg/25 mm) | 3.4 | 3.0 | 2.5 | 0.05 | 2.0 | 3.1 | 0 | 3.0 | 3.0 |

REFERENCE EXAMPLE 1

A 100 parts by weight amount of a polyethylene wax having an intrinsic viscosity of 0.08 dl/g (Mitsui High-wax 110p, produced by Mitsui Petrochemical Industries Ltd.) was charged into a pressure type glass reactor and dissolved at a temperature of 140° C. Then, 25 parts by weight of styrene monomer and 5.8 parts by weight of di-tert-butyl peroxide were added by a dropping funnel over 4 hours, and then the reaction was carried out for one hour, followed by degassing treatment in vacuum of 5 mmHg under the molten state for one hour to remove the volatiles, and the product was thereafter cooled. The styrene-grafted wax thus obtained was dissolved in p-xylene, reprecipitated with methyl ethyl ketone. After purification by repeating this procedure, the grafted amount was determined by NMR spectrum and IR absorption spectrum. As the result, the amount of styrene grafted was found to be 25 parts by weight based upon 100 parts by weight of the polyethylene wax.

REFERENCE EXAMPLES 2 TO 4

In Reference Example 1, the kind of the graft monomer and amount thereof were changed as shown in Table 3, but otherwise the same procedure was followed as in Reference Example 1.

REFERENCE EXAMPLES 5 TO 6

In Reference Example 1, a liquid ethylene-propylene copolymer (composition: ethylene 50 mol %, propylene 50 mol %, [η]: 0.04 dl/g, number average molecular weight 800, Mw/Mn 1.4) was used instead of the polyethylene wax, and the amount of the monomer grafted was changed as shown in Table 3, but otherwise the same procedure was followed as in Reference Example 1.

REFERENCE EXAMPLE 7

Reference Example 1 was entirely repeated, except that the intrinsic viscosity of polyethylene wax was changed to 0.52 dl/g and the amount of the monomer grafted was changed to that shown in Table 3.

EXAMPLES 13 TO 19

Into a kneader set at a temperature of 100° C. 100 parts by weight of an epoxy resin (EPOMIK ® R364, Mitsui Petrochemical Industries Ltd.), 11 parts by weight of a modified polyolefin and 4 parts by weight of dicyanamide were fed, and kneading was carried out at a screw rotational number of 50 rpm for 15 minutes to obtain an epoxy resin composition. Then, the composition was cured by heating at a temperature of 200° C. under a pressure of 60 kg/cm² for 10 minutes by a hot press.

The physical properties of the cured composition were evaluated according to the following methods.

[1] Izod impact strength: Measured according to ASTM D-256 using a test strip with a thickness of ⅛ inch.

[2] Peel-off strength . . . Using two sheets of soft aluminum (thickness 50μ, 20 cm square) as the material to be adhered, with a spacer of 50μ in thickness and 5 g of a sample therebetween, adhesion was effected under the above curing conditions. Then, a test strip was cut to a width of 25 mm, and the peel-off test was conducted under a cross-head speed of 250 mm/min.

[3] Melt viscosity . . . Melt viscosity at a temperature of 150° C. was measured by an Emylar rotatory viscometer.

COMPARATIVE EXAMPLES 6 TO 7

In Example 13, a polyethylene wax (Comparative Example 6) or an ethylene-propylene copolymer (Comparative Example 7) was used instead of the modified polyolefin, but otherwise the same procedure was followed as in Example 13. The results are shown in Table 3.

COMPARATIVE EXAMPLE 8

In Example 13, the modified polyolefin was not used, but otherwise the same procedure was followed as in Example 13. The results are shown in Table 3.

TABLE 3

|  |  |  |  | Example | | | | | | Comparative Example | | | Example |
|---|---|---|---|---|---|---|---|---|---|---|---|---|---|
|  |  |  |  | 13 | 14 | 15 | 16 | 17 | 18 | 1 | 2 | 3 | 19 |
| Epoxy resin amount (parts by weight) | | | | 100 | 100 | 100 | 100 | 100 | 100 | 100 | 100 | 100 | 100 |
| Epoxy resin Composition | Modified polyolefin | Kind | | Reference Example 1 | Reference Example 2 | Reference Example 3 | Reference Example 4 | Reference Example 5 | Reference Example 6 | Polyethylene wax | Ethylene-propylene copolymer | — | Reference Example 7 |
|  |  | Base polyolefin [η] (dl/g) | | 0.08 | 0.08 | 0.08 | 0.08 | 0.04 | 0.04 | 0.08 | 0.04 | — | 0.52 |
|  |  | Monomer added*1 (wt. parts) | Styrene | 25 | 70 | 35 | 120 | 25 | 50 | 0 | 0 | — | 25 |
|  |  |  | Methacrylonitrile | 0 | 0 | 35 | 120 | 0 | 50 | 0 | 0 | — | 0 |
|  |  | Grafted | Styrene | 25 | 67 | 33 | 117 | 25 | 50 | 0 | 0 | — | 25 |

TABLE 3-continued

| | | | Example | | | | | | Comparative Example | | | Example |
| --- | --- | --- | --- | --- | --- | --- | --- | --- | --- | --- | --- | --- |
| | | | 13 | 14 | 15 | 16 | 17 | 18 | 1 | 2 | 3 | 19 |
| | amount[*1] (wt. parts) | Methacrylonitrile | 0 | 0 | 33 | 117 | 0 | 50 | 0 | 0 | — | 0 |
| | Addition amount (wt. parts) | | 11 | 11 | 11 | 11 | 11 | 11 | 11 | 11 | 0 | 11 |
| | Hardener (dicyandiamide) (parts by weight) | | 4 | 4 | 4 | 4 | 4 | 4 | 4 | 4 | 4 | 4 |
| Physical properties | Izod impact strength (kg·cm/cm) | Notched | 5.6 | 6.4 | 5.8 | 7.1 | 6.2 | 6.0 | 2.0 | 2.0 | 2.0 | 6.5 |
| | | Unnotched | 46 | 41 | 47 | 46 | 48 | 47 | 4.8 | 4.8 | 4.9 | 52 |
| | Peel-off strength (kg/25 mm) | | 2.7 | 2.5 | 3.1 | 3.3 | 2.8 | 3.4 | 2.8 | 2.9 | 3.0 | 3.0 |
| | 150° C. Melt viscosity | | 4300 | 5300 | 7000 | 7200 | 4300 | 6000 | 4500 | 4500 | 4700 | 13000 |

[*1] Amount added based on 100 parts by weight of base polyolefin

I claim:

1. An epoxy resin composition comprising:
(A) 1 to 40 parts by weight of a modified low molecular weight polyolefin obtained by graft copolymerizing at least one graft monomer selected from the group consisting of:
 (i) at least one unsaturated carboxylic acid derivative selected from the group consisting of unsaturated carboxylic acids and anhydrides thereof and esters thereof,
 (ii) at least one aromatic vinyl compound, and
 (iii) at least one nitrile compound, onto a low molecular weight polyolefin having an intrinsic viscosity [η] of 0.01 dl/g to 1.0 dl/g, as measured in decalin at a temperature of 135° C.,
(B) 99 to 60 parts by weight of an epoxy resin (the total amount of (A) an (B) is 100 parts by weight), and
(C) a hardener for the epoxy resin.

2. A composition as claimed in claim 1, wherein said low molecular weight polyolefin is an ethylenic random copolymer consisting of 30 to 75 mol % of ethylene component and 25 to 70 mol % of an α-olefin component having 3 to 20 carbon atoms.

3. A composition as claimed in claim 1, wherein the low molecular weight polyolefin (A) comprises 0.2 to 50 parts by weight of at least one unsaturated carboxylic acid derivative component selected from the group consisting of unsaturated carboxylic acids having 3 to 10 carbon atoms and anhydrides thereof and esters thereof grafted onto 100 parts by weight of said low molecular weight polyolefin.

4. A composition as claimed in claim 3, wherein the modified low molecular weight polyolefin (A) has an intrinsic viscosity [η] of 0.01 to 0.3 dl/g, as measured in decalin at a temperature of 135° C. and a molecular weight distribution ($\overline{M}w/\overline{M}n$) of 4 or less, as measured by gel permeation chromatography.

5. A composition as claimed in claim 1, wherein the modified low molecular weight polyolefin (A) comprises 1 to 900 parts by weight of an aromatic vinyl compound and 0 to 900 parts by weight of a nitrile compound grafted onto 100 parts by weight of said low molecular weight polyolefin.

6. A composition as claimed in claim 5, wherein the modified low molecular weight polyolefin (A) has an intrinsic viscosity [η] of 0.03 to 1.0 dl/g, as measured in decalin at a temperature of 135° C. and a molecular weight distribution ($\overline{M}w/\overline{M}n$) of 4 or less, as measured by gel permeation chromatography.

7. A composition as claimed in claim 1, wherein the modified low molecular weight polyolefin (A) comprises 0 to 900 parts by weight of an aromatic vinyl compound and 1 to 900 parts by weight of a nitrile compound grafted onto 100 parts by weight of said low molecular weight polyolefin.

8. A composition as claimed in claim 7, wherein the modified low molecular weight polyolefin (A) has an intrinsic viscosity [η] of 0.03 to 1.0 dl/g, as measured in decalin at a temperature of 135° C. and a molecular weight distribution (Mw/Mn) of 4 or less, as measured by gel permeation chromatography.

9. A process for producing an epoxy resin composition, comprising the steps of: kneading, while heating,
(A) 1 to 40 parts by weight of a modified low molecular weight polyolefin obtained by graft copolymerizing at least one graft monomer selected from the group consisting of:
 (i) at least one unsaturated carboxylic acid derivative selected from the group consisting of unsaturated carboxylic acids and anhydrides thereof and esters of these,
 (ii) at least one aromatic vinyl compound, and
 (iii) at least one nitrile compound, onto a low molecular weight polyolefin having an inherent viscosity [η] of 0.01 dl/g to 1.0 dl/g, as measured in decalin at a temperature of 135° C., and
(B) 99 to 60 parts by weight of an epoxy resin (the total amount of (A) and (B) is 100 parts by weight) to make the unreacted amount of the component (B) based upon 100 parts by weight of the component (A) part by weight or less, and then
formulating a hardener (C) at a temperature not higher than the hardening temperature of the hardener (C), whereby an epoxy resin composition containing the components (A), (B) and (C) is produced.

10. An epoxy resin composition comprising:
(A) 1 to 40 parts by weight of a modified low molecular weight polyolefin obtained by graft copolymerizing at least one graft monomer selected from the group consisting of:
 (i) at least one unsaturated carboxylic acid derivative selected from the group consisting of unsaturated carboxylic acids and anhydrides thereof and esters thereof,
 (ii) at least one aromatic vinyl compound, and
 (iii) at least one nitrile compound, onto a low molecular weight polyolefin having an inherent viscosity [η] of 0.01 dl/g to 1.0 dl/g, as measured in decalin at a temperature of 135° C.,
(B) 99 to 60 parts by weight of an epoxy resin (the total amount of (A) and (B) is 100 parts by weight), (C) a hardener for the epoxy resin, and
(D) 0.01 to 20 parts by weight of a monoamine compound.

11. A composition as claimed in claim 10, wherein said low molecular weight polyolefin is an ethylenic random copolymer consisting of 30 to 75 mol % of ethylene component and 25 to 70 mol % of an α-olefin component having 3 to 20 carbon atoms.

12. A composition as claimed in claim 11, wherein the low molecular weight polyolefin (A) comprises 0.2 to 50 parts by weight of at least one unsaturated carboxylic acid derivative component selected from the group consisting of unsaturated carboxylic acids having 3 to 10 carbon atoms and anhydrides thereof and esters thereof grafted onto 100 parts by weight of said low molecular weight polyolefin.

13. A composition as claimed in claim 12, wherein the modified low molecular weight polyolefin (A) has an intrinsic viscosity [η] of 0.01 to 0.3 dl/g, as measured in decalin at a temperature of 135° C. and a molecular weight distribution ($\overline{Mw}/\overline{Mn}$) of 4 or less, as measured by gel permeation chromatography.

14. A composition as claimed in claim 1, wherein the modified low molecular weight polyolefin (A) comprises 1 to 900 parts by weight of an aromatic vinyl compound and 0 to 900 parts by weight of a nitrile compound, grafted onto 100 parts by weight of said low molecular weight polyolefin.

15. A composition as claimed in claim 14, wherein the modified low molecular weight polyolefin (A) has an intrinsic viscosity [η] of 0.03 to 1.0 dl/g, as measured in decalin at a temperature of 135° C. and a molecular weight distribution ($\overline{Mw}/\overline{Mn}$) of 4 or less, as measured by gel permeation chromatography.

16. A composition as claimed in claim 1, wherein the modified low molecular weight polyolefin (A) comprises 0 to 900 parts by weight of an aromatic vinyl compound and 1 to 900 parts by weight of a nitrile compound, grafted onto 100 parts by weight of said low molecular weight polyolefin.

17. A composition as claimed in claim 16, wherein the modified low molecular weight polyolefin (A) has an intrinsic viscosity [η] of 0.03 to 1.0 dl/g, as measured in decalin at a temperature of 135° C. and a molecular weight distribution (Mw/Mn) of 4 or less, as measured by gel permeation chromatography.

18. A process for producing an epoxy resin composition comprising the steps of:
kneading, while heating,
(A) 1 to 40 parts by weight of a modified low molecular weight polyolefin obtained by graft copolymerizing at least one graft monomer selected from the group consisting of:
 (i) at least one unsaturated carboxylic acid derivative selected from the group consisting of unsaturated carboxylic acids and anhydrides thereof and esters thereof,
 (ii) at least one aromatic vinyl compound, and
 (iii) at least one nitrile compound, onto a low molecular weight polyolefin having an inherent viscosity [η] of 0.01 dl/g to 1.0 dl/g, as measured in decalin at a temperature of 135° C.,
(B) 99 to 60 parts by weight of an epoxy resin (the total amount of (A) and (B) is 100 parts by weight, and
(D) 0.01 to 20 parts by weight of a monoamine compound, to carry out the reaction and thereafter,
formulating a hardener (C) at a temperature not higher than the hardening temperature of the hardener (C), whereby an epoxy resin composition containing the components (A), (B), (C) and (D) is produced.

* * * * *